(12) United States Patent
Beyaz et al.

(10) Patent No.: US 9,083,208 B2
(45) Date of Patent: Jul. 14, 2015

(54) BALL BEARING SUPPORTED ELECTROMAGNETIC MICROGENERATOR

(75) Inventors: Mustafa I. Beyaz, Antalya (TR); Reza Ghodssi, Silver Spring, MD (US); Christopher M. Waits, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 293 days.

(21) Appl. No.: 13/603,450

(22) Filed: Sep. 5, 2012

(65) Prior Publication Data

US 2014/0062087 A1    Mar. 6, 2014

(51) Int. Cl.
| | |
|---|---|
| *H02K 1/18* | (2006.01) |
| *H02K 7/08* | (2006.01) |
| *H02K 7/18* | (2006.01) |
| *H02K 15/03* | (2006.01) |
| *H02K 21/24* | (2006.01) |
| *H02K 21/02* | (2006.01) |
| *H02K 1/27* | (2006.01) |

(Continued)

(52) U.S. Cl.
CPC ............... *H02K 7/088* (2013.01); *H02K 1/182* (2013.01); *H02K 7/18* (2013.01); *H02K 15/03* (2013.01); *H02K 21/24* (2013.01); *H02K 1/2793* (2013.01); *H02K 3/26* (2013.01); *H02K 3/47* (2013.01); *H02K 21/026* (2013.01); *Y10T 29/49012* (2015.01)

(58) Field of Classification Search
CPC ..... H02K 1/182; H02K 1/2793; H02K 21/24; H02K 21/026

USPC ........... 310/40 MM, 268, 40 R, 156.32, 300, 310/309, 12.03
See application file for complete search history.

(56) References Cited

U.S. PATENT DOCUMENTS 3,375,386 A * 3/1968 Hayner et al. ................ 310/268
4,733,115 A * 3/1988 Barone et al. ............... 310/68 R
(Continued)

OTHER PUBLICATIONS

M. Beyaz, B. Hanrahan, and R. Ghodssi, "First Silicon Microturbine with Integrated Permanent Magnets Supported on Encapsulated Microball Bearings" Proceedings of the 10th Int'l Workshop on Micro and Nanotechnology for Power Generation and Energy Conversion Appl. (PowerMEMS 2010), Leuven, Belgium, Nov. 30-Dec. 3, 2010, pp. 167-171.*

(Continued)

*Primary Examiner* — John K Kim
*Assistant Examiner* — Robert E Mates
(74) *Attorney, Agent, or Firm* — Alan I. Kalb

(57) ABSTRACT

Methods and apparatus for forming an electromechanical device are disclosed. In some embodiments, an electromechanical device includes a first substrate; a second substrate; a rotor movably disposed in the first and second substrates and having a plurality of first turbine blades disposed on a first side of the rotor and a plurality of permanent magnets disposed on a second side of the rotor, wherein the plurality of permanent magnets are arranged about a central axis of the rotor, wherein adjacent permanent magnets have opposing magnetic poles; a channel disposed between the first and second substrates and a peripheral edge of the rotor; a plurality of microballs disposed in the channel to provide a bearing for the rotor; a third substrate disposed proximate the second side of the rotor and having a plurality of coils disposed therein such that rotation of the rotor induces current the plurality of coils.

6 Claims, 9 Drawing Sheets

(51) Int. Cl.
 *H02K 3/26* (2006.01)
 *H02K 3/47* (2006.01)

(56) References Cited

U.S. PATENT DOCUMENTS

| | | | |
|---|---|---|---|
| 5,180,940 A * | 1/1993 | Paratte et al. | 310/40 MM |
| 6,172,442 B1 * | 1/2001 | Jun | 310/268 |
| 7,109,625 B1 * | 9/2006 | Jore et al. | 310/198 |
| 2006/0055265 A1 * | 3/2006 | Zalusky | 310/156.32 |
| 2008/0100174 A1 * | 5/2008 | Stahlhut et al. | 310/268 |

OTHER PUBLICATIONS

Herrault, F.; Yen, B.C.; Chang-Hyeon Ji; Spakovszky, Z.S.; Lang, Jeffrey H.; Allen, M.G. "Fabrication and Performance of Silicon-Embedded Permanent-Magnet Microgenerators", J. Microelectromechanical Syst., vol. 19, No. 1, Feb. 2010 (pp. 4-13).*

Herrault, F.; Chang-Hyeon Ji; Allen, M.G., "Ultraminiaturized High-Speed Permanent-Magnet Generators for Milliwatt-Level Power Generation", Journal of Microelectromechanical Systems, vol. 17, No. 6, Dec. 2008 (pp. 1376-1387).*

* cited by examiner

US 9,083,208 B2

BALL BEARING SUPPORTED ELECTROMAGNETIC MICROGENERATOR

GOVERNMENT INTEREST

Governmental Interest—The invention described herein may be man of used and licensed by or for the U.S. Government.

FIELD OF INVENTION

Embodiments of the present invention generally relate to electromechanical devices and, more particularly, to methods and apparatus of forming electromechanical devices.

BACKGROUND OF THE INVENTION

As the critical dimensions of devices continue to shrink, novel methods and apparatus most be developed to overcome device limitations at smaller length scales. For example, microelectromechanical systems (MEMS), such as microfabricated generators, motors or other electromechanical devices, may require suitable rotational speeds for operation on a micron to sub-micron length scale. Unfortunately, conventional designs, such as air bearing rotors and the like, break down due to mechanical and vibrational instabilities, such as mass-induced mechanical instabilities caused by the addition of magnetic materials to the rotor or the like.

Therefore, the present invention provides improved electromechanical devices and methods for forming such electromechanical devices.

BRIEF SUMMARY OF THE INVENTION

Embodiments of the present invention comprise electromechanical devices and methods for forming the same. In some embodiments, an electromechanical device includes a first substrate; a second substrate; a rotor movably disposed in the first and second substrates and having a plurality of first turbine blades disposed on a first side of the rotor and a plurality of permanent magnets disposed on a second side of the rotor opposite the first side, wherein the plurality of permanent magnets are arranged about a central axis of the rotor, and wherein adjacent permanent magnets have opposing magnetic poles; a channel disposed between the first and second substrates and a peripheral edge of the rotor; a plurality of microballs disposed in the channel to provide a bearing for the rotor with respect to the first and second substrates; a third substrate disposed proximate the second side of the rotor; and a plurality of coils disposed in the third substrate such that rotation of the rotor induces current in each of the plurality of coils.

In some embodiments, a method of forming an electromechanical device includes providing a first substrate having a first portion of a circular channel disposed in a first surface of the first substrate and a second substrate having a second portion of the circular channel disposed in a first surface of the second substrate; placing a plurality of microballs in the second portion of the channel in the second surface of the second substrate; adjoining the first surface of the first substrate and the first surface of the second substrate to form the circular channel with the microballs present in the circular channel; etching, a second surface of the second substrate to form recess in the second surface, wherein the recess is formed in a region of the second surface internal from the circumference of the circular channel; etching from a second surface of the first substrate opposing the first surface of the first substrate and from a second surface of the second substrate opposing the first surface of the second surface to expose the channel forming a rotor in the first and second substrates; depositing a plurality of permanent magnets in the recess in an alternating sequence about a central axis of the rotor, wherein adjacent permanent magnets have opposing magnetic poles; and providing a third substrate below the second surface of the second substrate, wherein the third substrate has a plurality of coils disposed in the third substrate, wherein rotation of the rotor induces current in each of the plurality of coils or current flowing through each of the plurality of coils causes the rotor to rotate.

Other and further embodiments of the present invention are discussed herein.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Embodiments of the present invention comprise electromechanical devices and methods for forming the same. The inventive methods and apparatus advantageously allow for an electromechanical device, such as a motor or generator or other suitable MEMS device, to be operated at sufficient speeds (e.g., rotational rate of a rotor or the like) to function on a micron length scale or below. Other and further embodiments of the present invention are discussed below.

Figure 1:
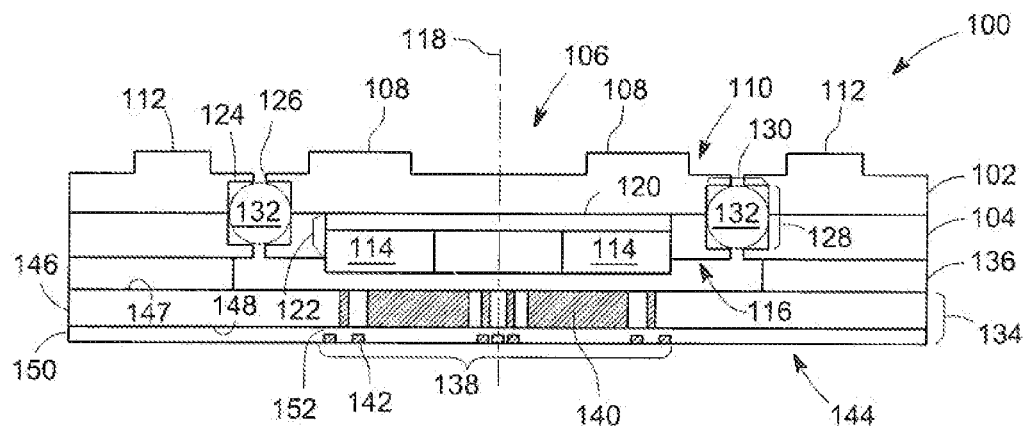
FIG. 1 depicts a side cross sectional view of an electromechanical device in accordance with some embodiments of the present invention.

FIG. 1 depicts a side cross sectional view of an electromechanical device 100 in accordance with some embodiments of the present invention. The electromechanical device 100 may include a first substrate 102 and a second substrate 104. The first and second substrates 102, 104 may include any suitable material manipulable on a micron length scale and below. For example, the first and second substrates 102, 104 may include one or more of silicon (Si) or the like. Each of the first and second substrates 102, 104 may have a thickness suitable for microelectronic fabrication, such as from about 0.5 mm to about 1 mm. The first and second substrate 102, 104 may be disposed adjacent to each other as illustrated in FIG. 1.

A rotor 106 may be movably disposed in the first and second substrates 102, 104. The rotor 106 may be formed of substantially similar materials as those discussed above for the first and second substrates 102, 104. The rotor 106 may have any suitable diameter for the particular application. In some embodiments, the diameter may be from about 1 mm to about 20 mm. The rotor 106 may include a plurality of first turbine blades 108 disposed on a first side 110 of the rotor 106. For example, the first plurality of turbine blades 108 may be utilized to interact with a flowing gas, such as water vapor ($H_2O$), nitrogen ($N_2$), air, carbon dioxide ($CO_2$), or the like, to rotate the rotor 106 when the electromechanical device 100 is configured in a generator mode.

Alternatively, if the electromechanical device 100 is configured for operation as an electric motor, then the plurality of first turbine blades 108 may be absent or may not be utilized, in some embodiments, the electromechanical device 100 may include a plurality of second turbine blades 112 disposed on the first substrate 102 about the plurality of first turbine blades 108. For example, the plurality of second turbine blades 112 may be utilized to shape the flow of the gas such that the rotor 106 may be rotated in an efficient manner, such as by utilizing the least amount of gas to achieve the maximum rotation of the rotor 106 or the like.

Figure 3A:
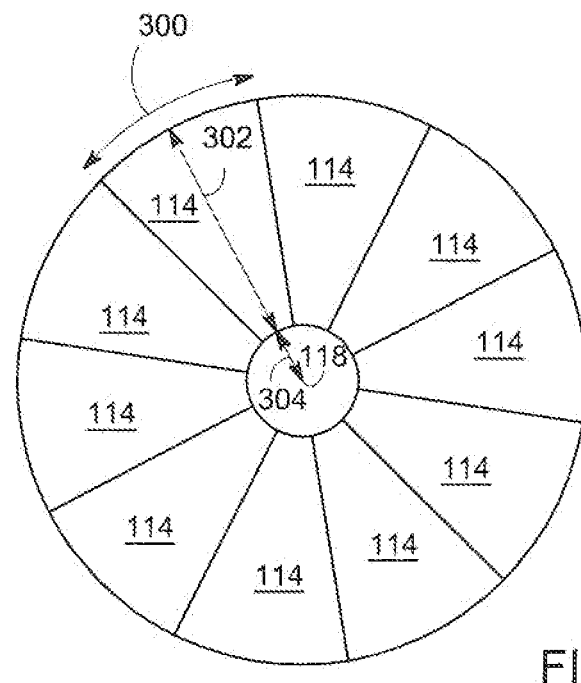
FIGS. 3A-B depict schematic views of a plurality of permanent magnetic and a single coil in electromechanical device in accordance with some embodiments of the present invention.

The electromechanical device 100 may include a plurality of permanent magnets 114 disposed on a second side 116 of the rotor 106. The second side 116 may oppose the first side 110 of the rotor 106 as illustrated in FIG. 1. The plurality of permanent magnets 114 may be arranged about a central axis 118 of the rotor 106 as illustrated in side cross sectional view in FIG. 1 and in a top down view in FIG. 3A. Adjacent permanent magnets 114 may have opposing magnetic poles. The plurality of permanent magnets may comprise any suitable magnetic material, such as neodymium iron boron (NdFeB), samarium cobalt (SmCo), aluminum nickel cobalt (AlNiCo), or the like. As illustrate in FIG. 3A, an outer arc length 300 of each permanent magnet 114 may range from about 1 mm to about 5 mm. A radial length 302 of each permanent magnet 114 may range from about 1 mm to about 5 mm. A radial gap distance 304 between each permanent magnet 114 and the central axis 118 may range from about 0 mm to about 3 mm. Each permanent magnet 114 may range in thickness from about 0.5 mm to about 1 mm.

The electromechanical device 100 may include an iron-containing layer 120 disposed on the second side 116 of the rotor 106 between the second side 116 of the rotor 106 and the plurality of permanent magnets 114. For example, the iron-containing layer 120 may be a soft magnetic material which may strengthen and/or improve the magnetic field provided by the plurality of permanent magnets 114 on the second side 116 of the rotor 106. The iron-containing layer 120 may include any suitable magnetic materials, such as one or more of iron (Fe), cobalt (Co), nickel (Ni), or the like. For example, the iron-containing layer 120 may range in thickness up to about 0.5 mm.

The plurality of permanent magnets 114 and the iron-containing layer 120 may be disposed in a recess 122 formed in the second side 116 of the rotor 106. For example, the recess 122 may extend from the second side 116 of the rotor 106 through the second substrate 104 and up to the first substrate 102 as illustrated in FIG. 1. Alternatively, the recess 122 may extend beyond the second substrate 104 and into the first substrate 102 (not shown). In some embodiments, the iron-containing layer 120 and the plurality of permanent magnets 114 may be disposed in the recess 122 formed in the second side 116 of the rotor 106 as illustrated in FIG. 1. In some embodiments, the plurality of permanent magnets may extend from the recess 122 beyond the second side 106 of the rotor 108 as illustrated in FIG. 1. For example, the permanent magnets 114 may be extended to increase thickness, which may result in lower magnetic saturation and therefore higher magnetic flux densities.

The electromechanical device 100 may include a channel 124 disposed between the first and second substrates 102, 104 and a peripheral edge 126 of the rotor 106. For example, the channel 124 may have any suitable shape and dimensions. For example, the channel may be a circular channel disposed about the rotor 106 and the central axis 118. In one exemplary embodiment illustrated in FIG. 1, the channel 124 may have a square cross section having a height 128 and a width 130. For example, the height 128 may range from about 0.286 mm to about 0.5 mm. For example, the width 130 may range from about 0.286 mm to about 0.5 mm.

The channel 124 may have a plurality of microballs 132 disposed in the channel 124. For example, the plurality of microballs 132 may provide a bearing for the rotor 106 to rotate with respect the first and second substrates 102, 104. For example, each microball may range in diameter between about 0.285 mm to about 0.5 mm. In some embodiments, each microball of the plurality of microballs 132 may have a diameter of about 285 microns. For example, each microball may be formed from materials suitable for use as bearings, such as stainless steel, silicon nitride or the like. For example, the number of microballs 132 in the plurality of microballs 132 may vary depending on the diameter of the rotor 106. In some embodiments, for example where the rotor 106 is about 12 mm in diameter, the number of microballs 132 in the plurality of microballs 132 may range from about 70 to about 120.

The electromechanical device 100 may include a third substrate 134 disposed proximate the second side 116 of the rotor 106 as illustrated in FIG. 1. For example, the third substrate 134 may be spaced apart from the rotor 106 by a spacer 136 or any suitable type of spacing device. In some embodiments, the spacer 136 may have a thickness of about 50 microns.

The third substrate 134 includes a plurality of coils 138 disposed in the third substrate 134 such that rotation of the rotor 106 induces current in each of the plurality of coils 138, or alternatively, a current flowing through the coils 138 provides a force on the permanent magnets 114 that drives the rotor 106. The plurality of coils 138 include a plurality of radial elements 140 disposed in the third substrate 134. The plurality of coils 138 may include a plurality of connective elements 142 disposed on a non-rotor facing surface 144 of the third substrate 134, wherein the plurality of connective elements 142 interconnect the plurality of radial elements 140 to form the plurality of coils 138. For example, each radial element 140 may be formed of any suitable conductive material, such as one or more of copper (Cu), silver (Ag), gold (Au), or the like. For example, each connective element 142 may be formed of any suitable conductive material, such as one or more of copper (Cu), silver (Ag), gold (Au), or the like.

The third substrate 134 may include a semiconductor substrate 146 having the plurality of radial elements 140 disposed through the semiconductor substrate 146, for example, from a first surface 147 of the semiconductor substrate 146 to a second surface 148 of the semiconductor substrate 146. For example, the semiconductor substrate 146 may be formed of any suitable semiconductor material, such as one or more of silicon (Si) or the like. The third substrate 134 may include a dielectric layer 150 forming the non-rotor facing surface 144 of the third substrate 134, wherein the plurality of connective elements 142 are disposed in the dielectric layer 150. The dielectric layer may be formed of any suitable dielectric material, such as one or more of silicon oxide ($SiO_2$), silicon nitride (SiN), an epoxy-based photoresist, such as SU-8, or the like. The dielectric layer 150 may include a plurality of openings 152 (such as vies 704 and trenches 706 discussed below with respect to FIG. 7), wherein each opening connects one end of each connective element 142 to one end of each radial element 140, as illustrated in FIG. 1. A more detailed description of the openings 152 is discussed below with respect to FIG. 6.

Figure 2A:
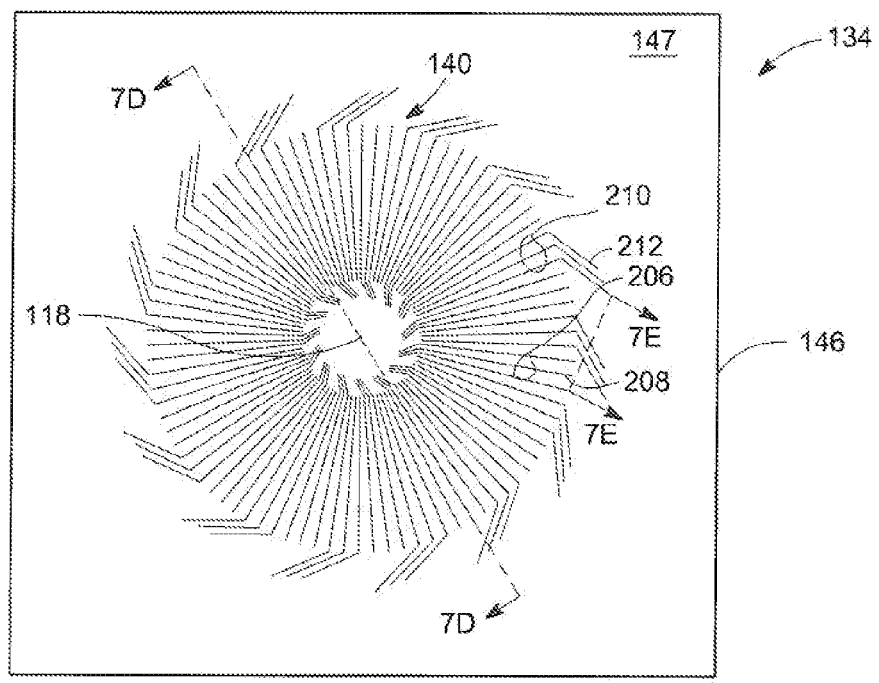
FIGS. 2A-B depict a top and bottom views, respectively, of a portion of the electromechanical device having a third substrate with a plurality of coils in accordance with some embodiments of the present invention.
Figure 2B:
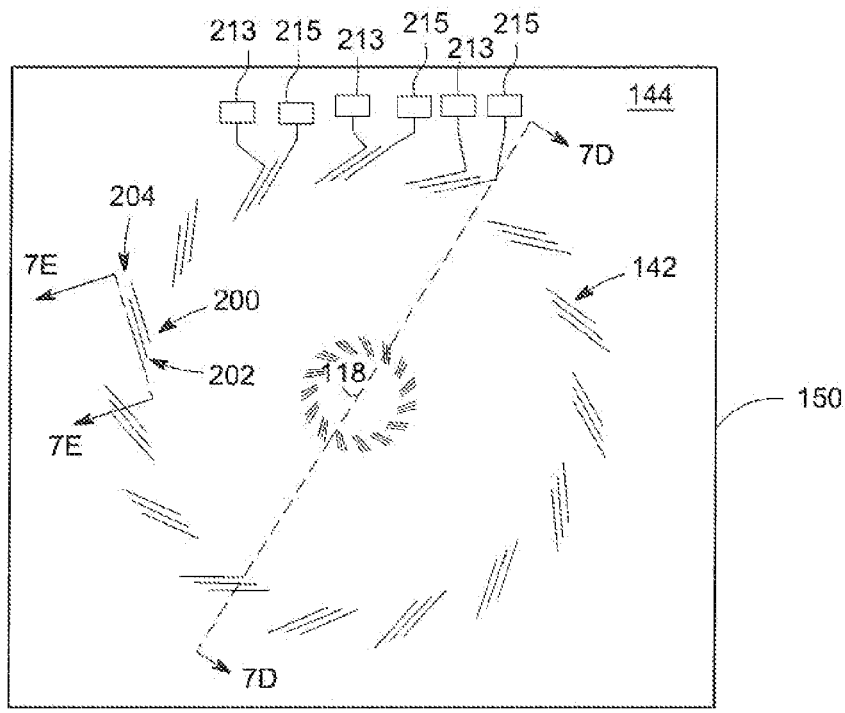
Figure 2C:
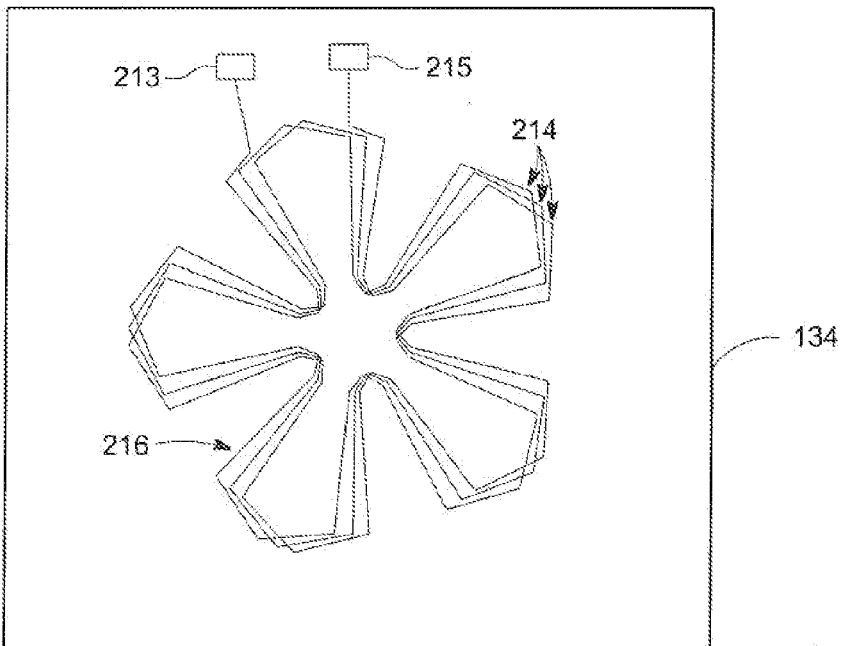
FIG. 2C depicts a schematic view of a single coil of the plurality of coils in the electromechanical device in accordance with some embodiments of the present invention.

The plurality of coils 138 are depicted from several perspective views as illustrated in FIGS. 2A-C. For example, FIG. 2A depicts a top down view of the third substrate 134 illustrating the first surface 147 of the semiconductor substrate 146. As shown in FIG. 2A, the plurality of radial elements 140 may be disposed in the semiconductor substrate 146. An opposing view of the third substrate 134 is illustrated in FIG. 2B. For example, FIG. 2B depicts a bottom up view of the third substrate illustrating the non-rotor facing surface 144 (i.e., the dielectric layer 150). As shown in FIG. 23, the plurality of connective elements 142 may be disposed in the dielectric layer 150.

For example, the connectivity between the plurality of radial elements 140 and the plurality of connective elements 142 may be demonstrated by considering a plurality of connective elements 200 as illustrated in FIG. 23, each connective element 200 having a first end 202 and a second end 204, and a plurality of first radial elements 206, each first radial element having a first end 208, and a plurality of second radial elements 210, each second radial element having a second end 212 as illustrated in FIG. 2A. A connection between the pluralities of connective elements 200, first radial elements 206 and second radial elements 210 can be made via the openings 152 (openings 152 not illustrated in FIGS. 2A-B). For example, each first end 202 of each connective element 200 may be coupled to a corresponding first end 208 of each first radial element 206. Similarly, each second end 204 of each connective element 200 may be coupled to a corresponding second end 212 of each second radial element 210.

For example, connecting the plurality of radial elements 140 and the plurality of connective elements 142 as discussed above for the exemplary embodiment of the pluralities of connective elements 200, first radial elements 206 and second radial elements 210 may result in a plurality of coils 138. A single coil 138 resulting from connecting the pluralities of radial elements 140 and connective elements 142 is illustrated in FIG. 2C.

Figure 3B:
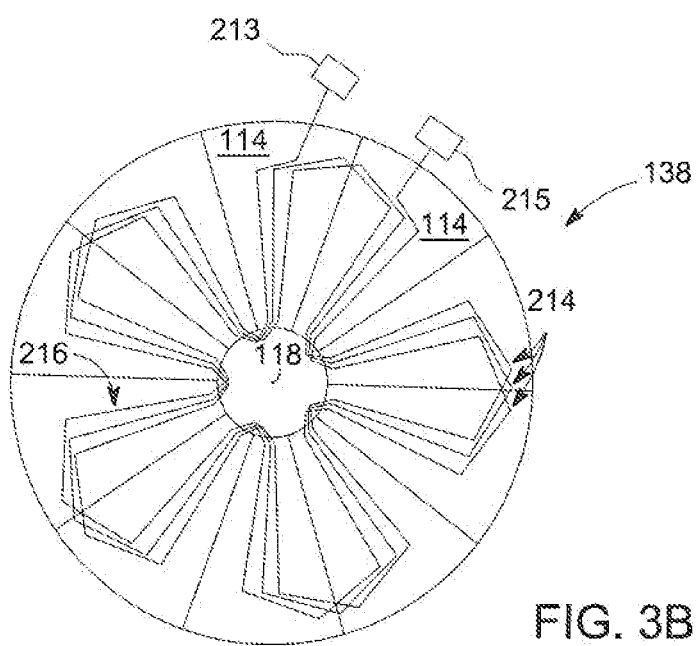

For example, the single coil 138 as illustrated in FIG. 2C may include a plurality of loops 214. The plurality of loops 214 may be configured in series between an inlet 213 and an outlet 215, for example, such that an outlet of one loop 214 feeds into the inlet of another loop 214. For example the inlet 213 and outlet 215 may be coupled to a load, such as a battery, a device to be powered, or the like. As illustrated in FIG. 2C, the single coil 138 has three loops 214 configured in series. Each loop 214 may comprise a plurality of symmetric sub-sections 216. As illustrated by overlay with the plurality of permanent magnets 114 in FIG. 3B, in some embodiments, an area encompassed by each symmetric sub-section 216 of each loop 214 may be, about equal to half the area covered by a pair of adjacent permanent magnets 114 disposed on the rotor 106. For example, the configuration of the single coil 138 as illustrated in FIG. 3B may be commonly referred to as a one phase, 10 pole coil with three turns per pole. For example, one phase may refer to the single coil 138, the 10 pole may refer to 10 permanent magnets 114, and three turns per pole may refer to the three loops 214 as illustrated in FIG. 3B. In some embodiments, as suggested by the numbers of radial elements 140 and connective elements 142 as shown in FIGS. 2A-B, respectively, the plurality of coils 138 may include three coils, wherein each coil has three loops 214 and each loop has five symmetric sub-sections 216, or commonly referred to as a three phase (e.g., three coils 138), 10 pole (e.g., 10 permanent magnets 114) coils with three turns (e.g., three loops 214) per pole. Further the thickness of radial elements 140 may be selected to adjust resistance such that magnetic flux flow through the third substrate 134 is optimized. For example, in some embodiments, the thickness may be selected to decrease the resistance. In some embodiments, the thickness may be selected at about 400 micrometers.

In operation, the electromechanical device 100 as illustrated in FIGS. 1-3 may function as either a generator or a motor. For example, as a generator, a gas may be used to turn the rotor 106 which creates a time varying magnetic field due to the motion of the permanent magnets 114 to induce a current in the plurality of coils 138. For example, the induced current may be connected through the coils 138 to a load, such as a battery to be charged, a device to be powered or the like. Alternatively, as a motor, a load, such as a battery or another device can provide current through the coils 138 to provide a force on the permanent magnets to induce motion in the rotor 106. The moving rotor 106 may be used to drive a mechanical device, such as micro gears, fans (for pumping liquid) or the like.

Figure 8:
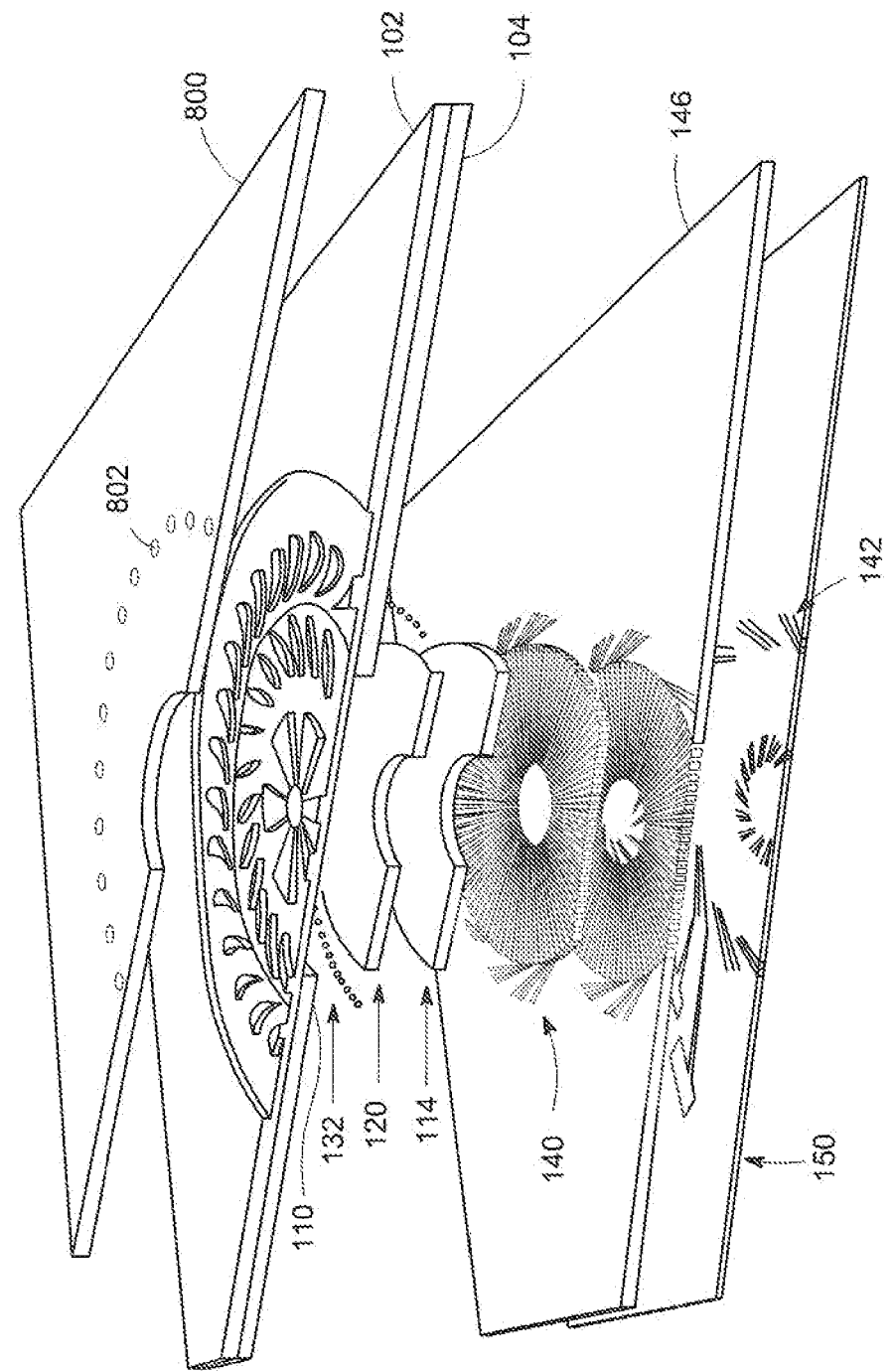
FIG. 8 depicts an exploded view of an electromechanical device in accordance with some embodiments of the present invention.

FIG. 8 depicts an exploded view of the electromechanical device 100 in accordance with some embodiments of the present invention. For example, FIG. 8 illustrates among other features, exemplary configurations of the first and second turbine blades 108, 112. Optional additional embodiments of the electromechanical device 100 are possible. For example, as illustrated in FIG. 8, the electromechanical device 100 may include a fourth substrate 800 disposed above the first substrate 102. The fourth substrate 800 may include a plurality of hole 802 disposed therethrough and above one or more of the first or second turbine blades 108, 112. As illustrated in FIG. 8, the holes 802 are disposed proximate to the second turbine blades 112. For example, the holes 802 may be utilized to channel a gas into the second turbine blades 112 such that the rotor 110 can be rotated to induce a current in the plurality of coils 138. However, the embodiments of FIG. 8 are merely exemplary and other embodiments, such as regarding the configuration of the first and second turbine blades 108, 112 and the fourth substrate 800 and arrangement of the holes 802 are possible. Alternatively, an air turbine structure such as described by the fourth substrate 800 and the first and second turbine blades 108, 112 may be replaced by any suitable mechanical means for turning the rotor 110. For example, mechanical means may include a shaft and linkages coupled to an internal combustion engine to drive the rotor 110 (not shown) or other suitable mechanical means.

Figure 4:
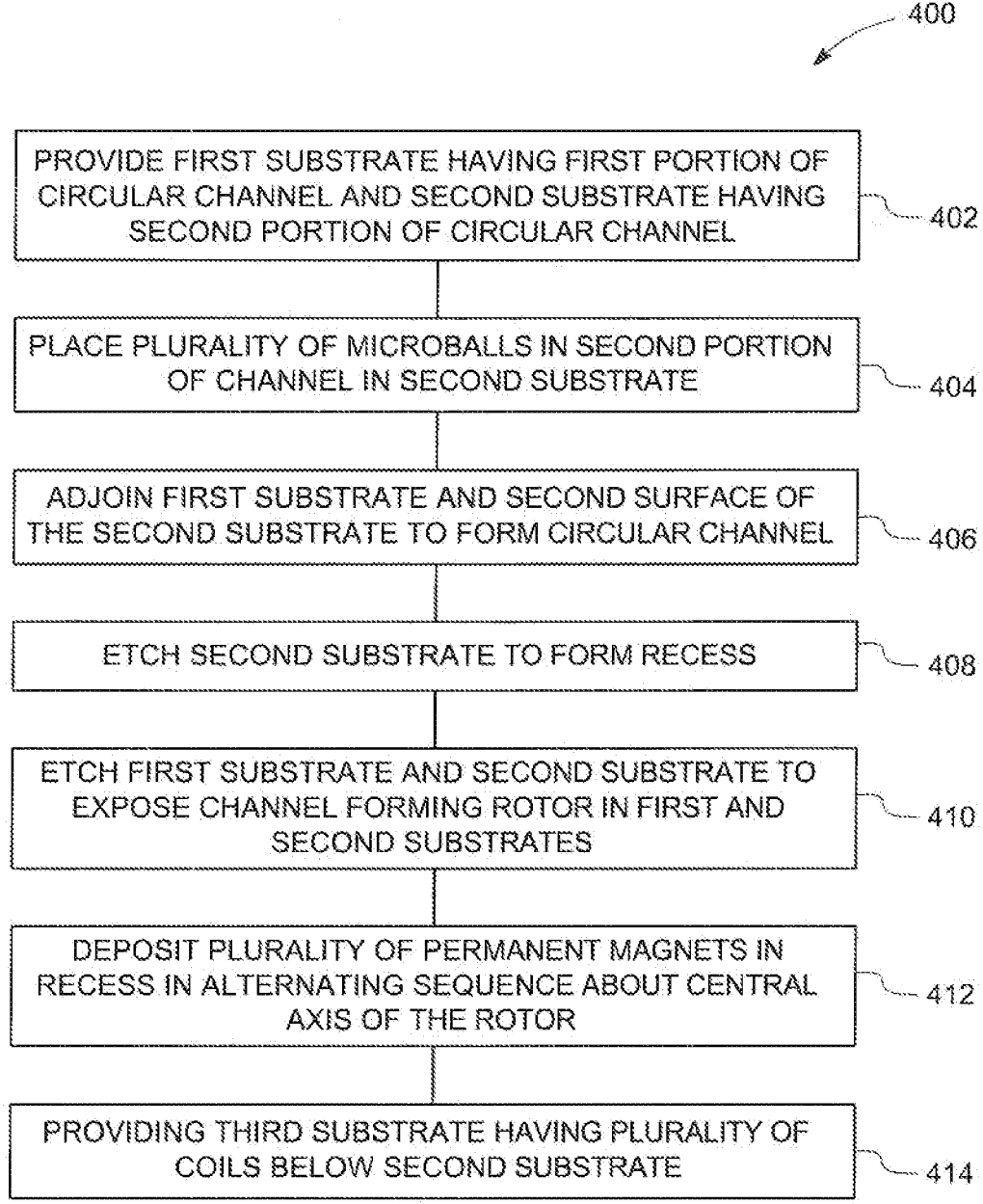
FIG. 4 depicts a flow chart for a method of forming an electromechanical device in accordance with some embodiments of the present invention.

FIG. 4 depicts a flow chart for a method 400 of forming an electromechanical device in accordance with some embodiments of the present invention. For example, the method 400 may be described below in accordance with FIGS. 5A-H depicts the stages of fabrication of the rotor 106 of the electromechanical device 100 in accordance with some embodiments of the present invention.

The method 400 begins at 402 by providing the first substrate 102 having a first portion 502 of the channel 124 disposed in a first surface 504 of the first substrate 102 and the second substrate 104 having a second portion 506 of the channel 124 disposed in a first surface 508 of the second substrate 104. For example, the first or second substrate 102, 104 is illustrated in a top down view in FIG. 5A.

At 404, the plurality of microballs 132 may be placed in the second portion 506 of the circular channel 124 in the first surface 508 of the second substrate 104. The plurality of microballs 132 may be arranged so as to include any suitable number of microballs 132 as discussed above.

Figure 5A:
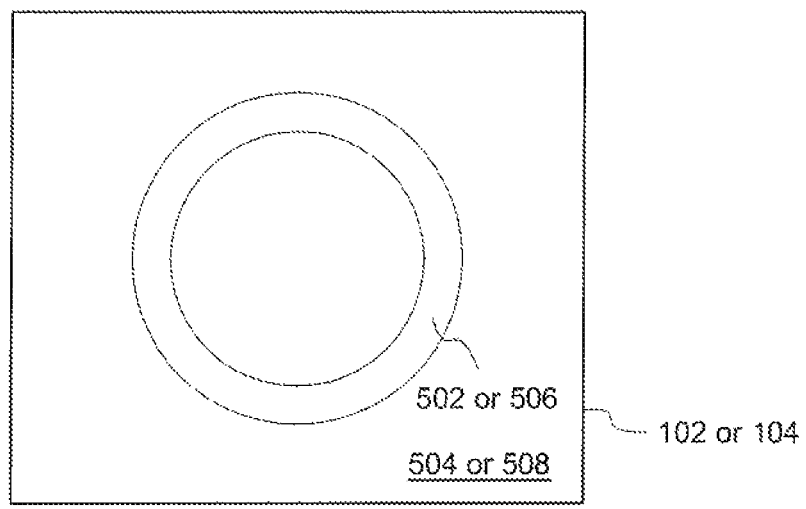
FIG. 5A-H depicts the stages of fabrication of a rotor of an electromechanical device in accordance with some embodiments of the present invention.
Figure 5B:
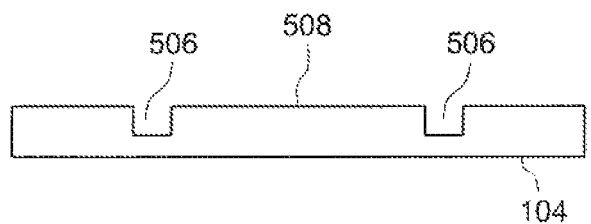
Figure 5C:
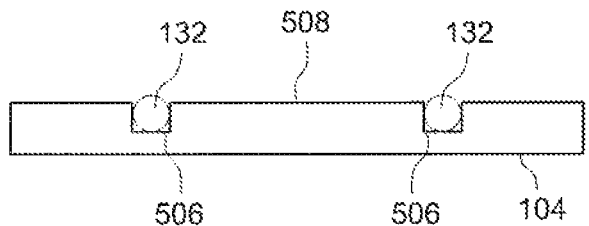
Figure 5D:
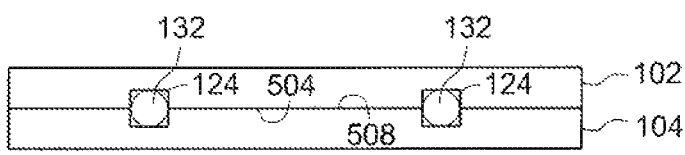

At 406, the first surface 504 of the first substrate 102 and the first surface 508 of the second substrate 104 may be adjoined to form the circular channel 124 with the microballs 132 present in the circular channel 124 as illustrated in FIG. 5D. For example, the first surfaces 504, 508 may be adjoined by any suitable method, for example, such as by including an adhesive layer between the first surfaces 504, 508 (not shown), or by heating the substrates 102, 104 to permit inter-diffusion between the first surfaces 504, 508, for direct surface-to-surface bonding.

Figure 5E:
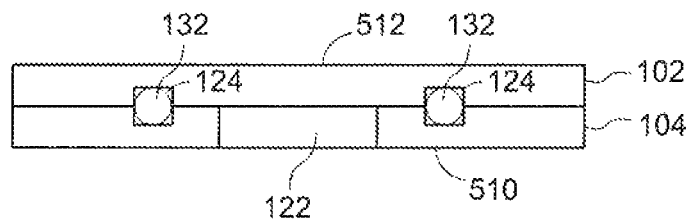

At 408, a second surface 510 of the second substrate 104 may be etched to form the recess 122 in the second surface 510. As illustrated in FIG. 5E, the recess 122 may be formed in a region of the second surface 510 internal from the circumference of the channel 124. As discussed above, the recess 122 may be etched to any desired depth including up to the first substrate 102 as shown in FIG. 5E or into the first substrate 102 (not shown).

Figure 5F:
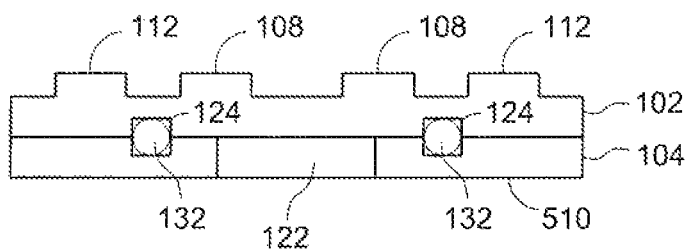

Optionally, depending on an application of the electromechanical device 100 as a motor or a generator, a second surface 512 of the first substrate 102 may be etched to form the plurality of first turbine blades 108 as illustrated in FIG. 5F. Similarly, simultaneously or in a separate processing step, the second surface 512 of the first substrate 102 may be etched to form the plurality of second turbine blades 112. Embodiments of the pluralities of first and second turbine blades 108, 122 have been discussed above.

Figure 5G:
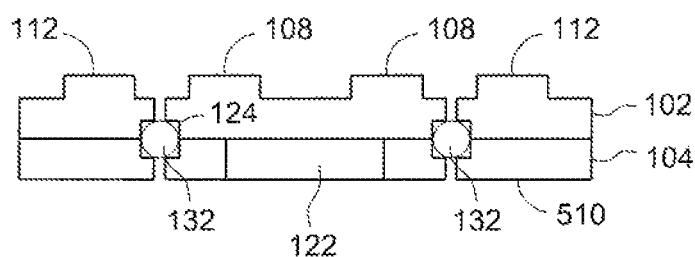

At 410, the second surface 512 of the first substrate 104 and the second surface 510 of the second substrate 104 may be etched to expose the channel 124 to form the rotor 106 in the first and second substrates 102, 104 as illustrated in FIG. 5G. Once etched at 410, the rotor 106 may be capable of free rotation relative to the first and second substrates.

Figure 5H:
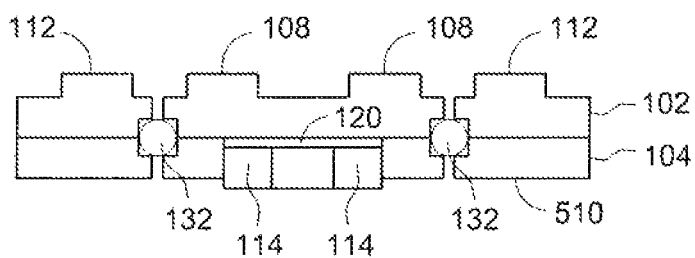

At 412, the plurality of permanent magnets 114 may be deposited in the recess 122 in an alternating sequence about a central axis of the rotor 118 as illustrated in FIG. 5H, wherein adjacent permanent magnets have opposing magnetic poles as discussed above. Each permanent magnet 114 may be attached to the recess 122 by an adhesive or the like. Optionally, as discussed above, the iron-containing layer 120 may be deposited in the recess 122 prior to depositing the plurality of permanent magnets 114. For example, the iron-containing layer may be attached to the recess 122 using an adhesive, such as an epoxy or the like. In embodiments where the iron-containing layer 120 is used, each permanent magnet 114 may be attach to the iron-containing layer 120 through magnetic interactions between the iron-containing layer 120 and each permanent magnetic 114.

Figure 6:
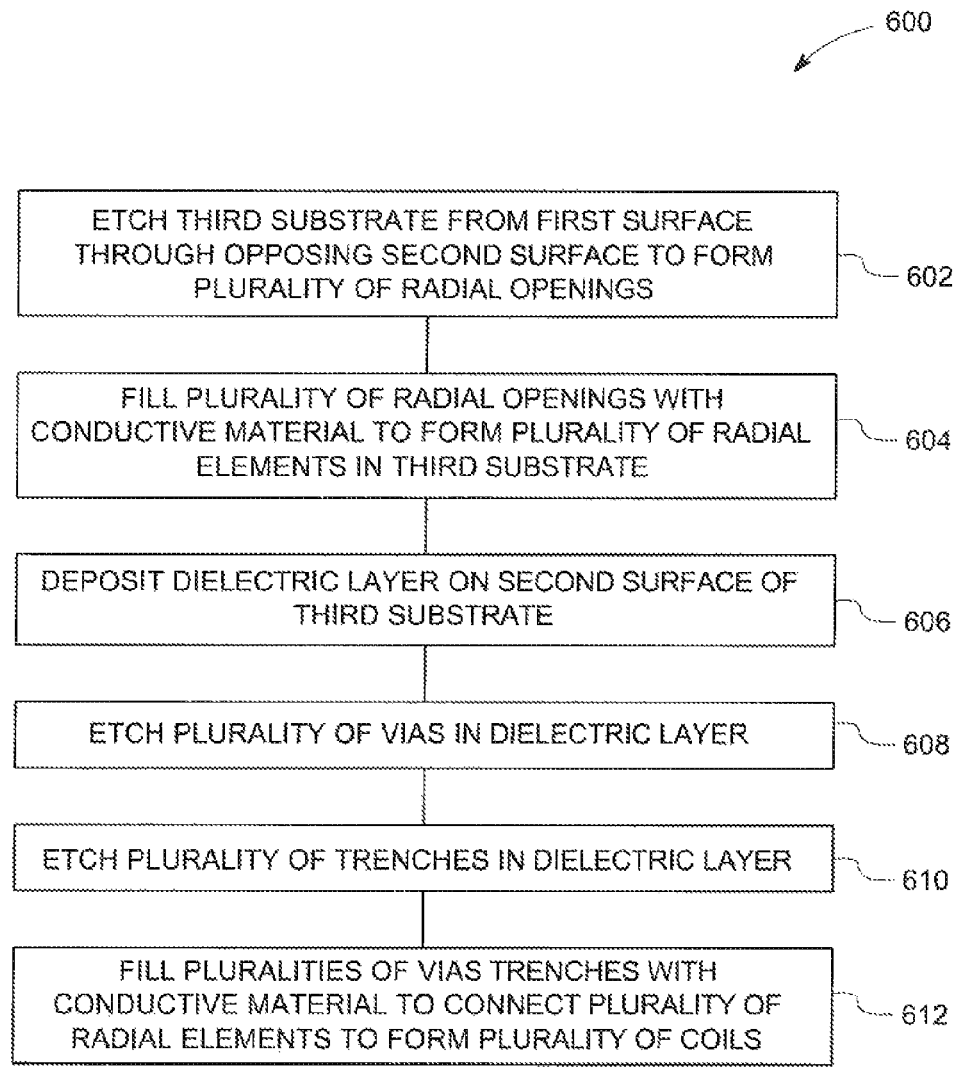
FIG. 6 depicts a flow chart for a method of forming a plurality of coils for an electromechanical device in accordance with some embodiments of the present invention.

At 414, the third substrate 134 may be provided below the second surface 510 of the second substrate 104. The third substrate 134 may be spaced apart from the rotor 106 by the spacer 136 as discussed above. The plurality of coils 138 may be formed in the third substrate 134 by a method 600 as discussed below. FIG. 6 depicts a flow chart for the method 600 of forming the plurality of coils 138 for an electromechanical device 100 in accordance with some embodiments of the present invention. The method 600 is described below according to the stages of fabrication of a plurality of coils as depicted in FIGS. 7A-E in accordance with some embodiments of the present invention. FIGS. 7A-D may illustrate an exemplary cross section of the third substrate 134 as shown in FIGS. 2A-B which may be disposed through the central axis 118 and through one or more radial elements 140. Similarly, FIG. 7E may illustrate an exemplary cross section of the third substrate 134 as shown in FIGS. 2A-B which may be disposed through a connective element 142, such as the exemplary connective element 200 as discussed above.

Figure 7A:
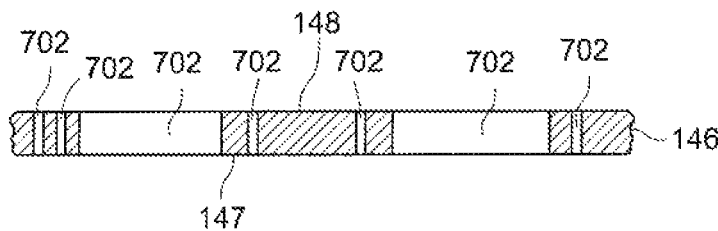
FIGS. 7A-E depict the stages of fabrication of a plurality of coils for an electromechanical device in accordance with some embodiments of the present invention.
Figure 7B:
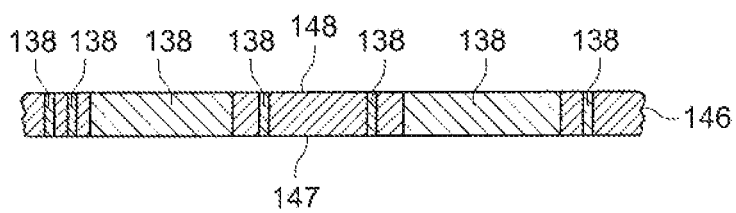

The method 600 may begin at 602 by etching the semiconductor substrate 146 from the first surface 147 through the opposing second surface 148 (or vice versa) to form a plurality of radial openings 702 as illustrated in FIG. 7A. For example, the semiconductor substrate 146 may be patterned by any suitable lithographic process, such by exposing a mask layer, such as a photoresist, hard mask, or the like to form a patterned mask layer (not shown). The plurality of radial openings 702 may be etched through the patterned mask layer by any suitable etching method for etching semiconductor substrates, such as any suitable plasma etch process, such as dry reactive ion etch (DRIE) or the like. After the etch process is complete, the patterned mask layer may be removed by a stripping process or the like, or alternatively, the patterned mask layer may remain until after the radial openings 702 are filled at 604 and then removed.

At 604, the plurality of radial openings 702 may be filled with a conductive material to form the plurality of radial elements 140 in the semiconductor substrate 146. As discussed above, the conductive material may be copper (Cu) or the like. The conductive material may be deposited by any suitable method, such as chemical or physical vapor deposition, or the like. After the conductive material has been deposited at 604, the patterned mask layer may be removed. Alternatively, if the patterned mask layer was removed at 602, a polishing method, chemical treatment or the like may be used to remove excess conductive material from the surfaces of the semiconductor substrate 146.

At 606, the dielectric layer 150 may be deposited on the second surface 148 of the semiconductor substrate 146 as illustrated in FIG. 6C. For example, the dielectric layer 150 may be deposited by any suitable deposition process, such as chemical vapor deposition or the like.

At 608, a plurality of vias 704 may be etched in the dielectric layer 150. The vias 704 are absent from FIG. 6C as vies 704 do not appear in that exemplary cross sectional view of the third substrate 134. For example, the vias 704 are illustrated in FIG. 7E, which is a cross sectional view along the connective element 200. The position of each via 704 may coincides with an end of a radial element in the plurality of radial elements 138. For example, as illustrated in FIG. 7E, each via 704 may coincide with the first end 208 of each first radial element 206 or the second end 212 of each second radial element 210 such that the first and second ends 208, 212 may be coupled via the connective element 200 disposed in the dielectric layer 150. The vias 704 may be formed by any suitable combination of patterning and etching of the dielectric layer 150.

Figure 7C:
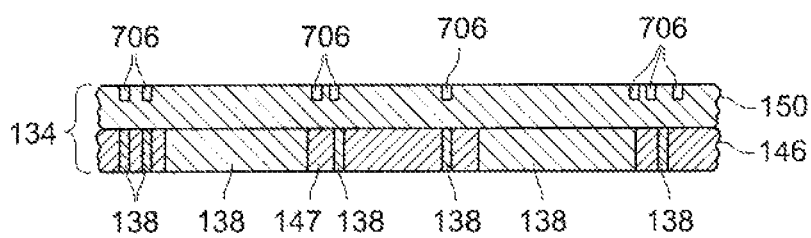
Figure 7D:
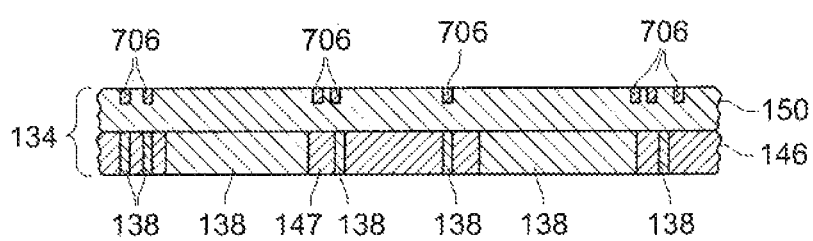
Figure 7E:
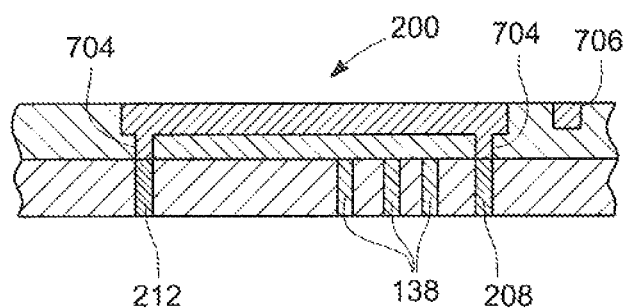

At 610, a plurality of trenches 706 are etched in the dielectric layer 150 as illustrated in FIG. 7C. The trenches 706 may not extend through the dielectric layer 150 as illustrated in the cross sectional view of FIG. 7C. As shown in FIG. 7E, each trench 706 may connect a pair of vias 704 disposed above the ends of adjacent radial elements (e.g., the first and second ends 208, 212 of the respective first and second radial elements 206, 210). The trenches 706 may be formed by any suitable combination of patterning and etching of the dielectric layer 150.

At 612, the pluralities of vias 704 and trenches 706 may be filled with a conductive material to connect the plurality of radial elements 140 to form the plurality of coils 138 by forming the plurality of connective elements 142 in the dielectric layer 150 to connect the plurality of radial elements 140. As discussed above, a cross sectional view illustrating the connectivity between the connective element 200 and the first and second ends 208, 212 of the respective first and second radial elements 206, 210 is illustrated in FIG. 7E. Any suitable methods for depositing the conductive material in the vies 704 and the trenches 706 may be utilized, for example, such as those discussed above for forming the plurality of radial elements 140 at 604. The conductive material may be any suitable conductive material as discussed above, such as copper (Cu) or the like.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. An electromechanical device, comprising:
   a first substrate;
   a second substrate;
   a rotor movably disposed in the first and second substrates and having as plurality of first turbine blades disposed on a first side of the rotor and a plurality of permanent magnets disposed on a second side of the rotor opposite the first side, wherein the plurality of permanent magnets are arranged about a central axis of the rotor, and wherein adjacent permanent magnets have opposing magnetic poles;
   a channel disposed between the first and second substrates and a peripheral edge of the rotor;
   a plurality of microballs disposed in the channel to provide a bearing for the rotor with respect to the first and second substrates;
   a third substrate disposed proximate the second side of the rotor comprising a semiconductor substrate having a plurality of radial elements disposed through the semiconductor substrate;
   a dielectric layer having a plurality of openings in the dielectric layer, wherein each opening connects one end of a connective element to one end of each radial element and forming the non-rotor facing surface of the third substrate, wherein a plurality of the connective elements arc disposed in the dielectric layer,
   a plurality of coils disposed in the third substrate such that rotation of the rotor induces current in each of the plurality of coils
   said plurality of coils further comprise the plurality of radial elements disposed in the third substrate and about the central axis of the rotor, the plurality of connective elements disposed on a non-rotor facing surface of the third substrate, wherein the plurality of connective elements interconnect the plurality of radial elements to form the plurality of coils and,
   a plurality of loops, wherein each loop comprises a plurality of symmetric sub-sections and wherein an area encompassed by each symmetric sub-section of each loop is about equal to half the area covered by a pair of adjacent permanent magnets disposed on the rotor.

2. The electromechanical device of claim 1, wherein each microball of the plurality of microballs has a diameter of about 285 microns.

3. The electromechanical device of claim 1, further comprising:
   a plurality of second turbine blades disposed on the first substrate about the plurality of first turbine blades.

4. The electromechanical device of claim 1, further comprising:
   an iron-containing layer disposed on the second side of rotor between the second side of the rotor and the plurality of permanent magnets.

5. The electromechanical device of claim 4, wherein the iron-containing layer and the plurality of permanent magnets are disposed in a recess formed in the second side of the rotor.

6. The electromechanical device of claim 5, wherein the plurality of permanent magnets extend from the recess beyond the second side of the rotor.

* * * * *